United States Patent
Holmes

(10) Patent No.: US 9,361,310 B1
(45) Date of Patent: Jun. 7, 2016

(54) METHOD AND SYSTEM FOR NETWORK USER ACCESS IMPERSONATION FOR MULTI-THREADED BACKUP APPLICATIONS

(71) Applicant: EMC Corporation, Hopkinton, MA (US)

(72) Inventor: Dennis Holmes, San Jose, CA (US)

(73) Assignee: EMC CORPORATION, Hopkinton, MA (US)

( * ) Notice: Subject to any disclaimer, the term of this patent is extended or adjusted under 35 U.S.C. 154(b) by 76 days.

(21) Appl. No.: 13/729,301

(22) Filed: Dec. 28, 2012

(51) Int. Cl.
G06F 17/30 (2006.01)

(52) U.S. Cl.
CPC .................................... G06F 17/302 (2013.01)

(58) Field of Classification Search
CPC ........................... G06F 11/1464; G06F 17/302
USPC ......................................................... 707/652
See application file for complete search history.

(56) References Cited

U.S. PATENT DOCUMENTS

| 6,513,051 | B1 * | 1/2003 | Bolosky | G06F 11/1453 |
| 7,594,138 | B2 * | 9/2009 | Abdulvahid | G06F 11/1469 714/6.1 |
| 7,966,293 | B1 * | 6/2011 | Owara | G06F 11/1448 707/654 |
| 8,060,473 | B1 * | 11/2011 | Dhumale | G06F 11/1464 707/640 |
| 8,180,735 | B2 * | 5/2012 | Ansari | G06Q 30/04 380/255 |
| 8,484,163 | B1 * | 7/2013 | Yucel | G06F 17/30289 370/216 |
| 2006/0004890 | A1 * | 1/2006 | Semple | G06F 17/30722 |
| 2007/0266062 | A1 * | 11/2007 | Young | G06F 11/1004 |
| 2009/0106327 | A1 * | 4/2009 | Dilman | G06F 11/0727 |
| 2009/0228531 | A1 * | 9/2009 | Baumann | G06F 11/1451 |
| 2010/0205152 | A1 * | 8/2010 | Ansari | G06Q 30/04 707/654 |
| 2010/0257143 | A1 * | 10/2010 | Sosnosky | G06F 11/1448 707/682 |
| 2011/0246425 | A1 * | 10/2011 | Munoz | G06F 11/1458 707/640 |

* cited by examiner

*Primary Examiner* — Huawen Peng
(74) *Attorney, Agent, or Firm* — Dergosits & Noah LLP; Todd A. Noah

(57) ABSTRACT

Network user access impersonation for multi-threaded backup applications is described. A backup application receives a first user identity and a second user identity of a set of user identities. The backup application calls a network file system service. The network file system service applies the first user identity to a first thread of a set of threads of a backup application. The network file system service applies the second user identity to a second thread of the set of threads of the backup application. The network file system service enables the first thread to access a first backup file on a first network storage device based on the first user identity. The network file system service enables the second thread to access a second backup file on a second storage device based on the second user identity.

20 Claims, 3 Drawing Sheets

METHOD AND SYSTEM FOR NETWORK USER ACCESS IMPERSONATION FOR MULTI-THREADED BACKUP APPLICATIONS

BACKGROUND

If a software error corrupts a database, or if erroneous data updates the database, a database administrator may restore the database to a previous uncorrupted state that does not include the erroneous data. A backup application executes a backup operation either occasionally or continuously to enable this restoration, storing each desired database state (the values of its data and these values' embedding in database's data structures) within dedicated backup files on a storage device. When a database administrator decides to return a database to a previous state, the database administrator specifies the desired previous state by identifying a desired point in time when the database was in this state, and the backup application executes a restore operation to restore the corresponding backup files for that state to the database. A database administrator may reduce the amount of backup data periodically stored to a storage device by configuring the database system to provide an incremental backup, which occurs only when files and directories that are modified after a previous backup is copied from the database's source device to the storage device.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
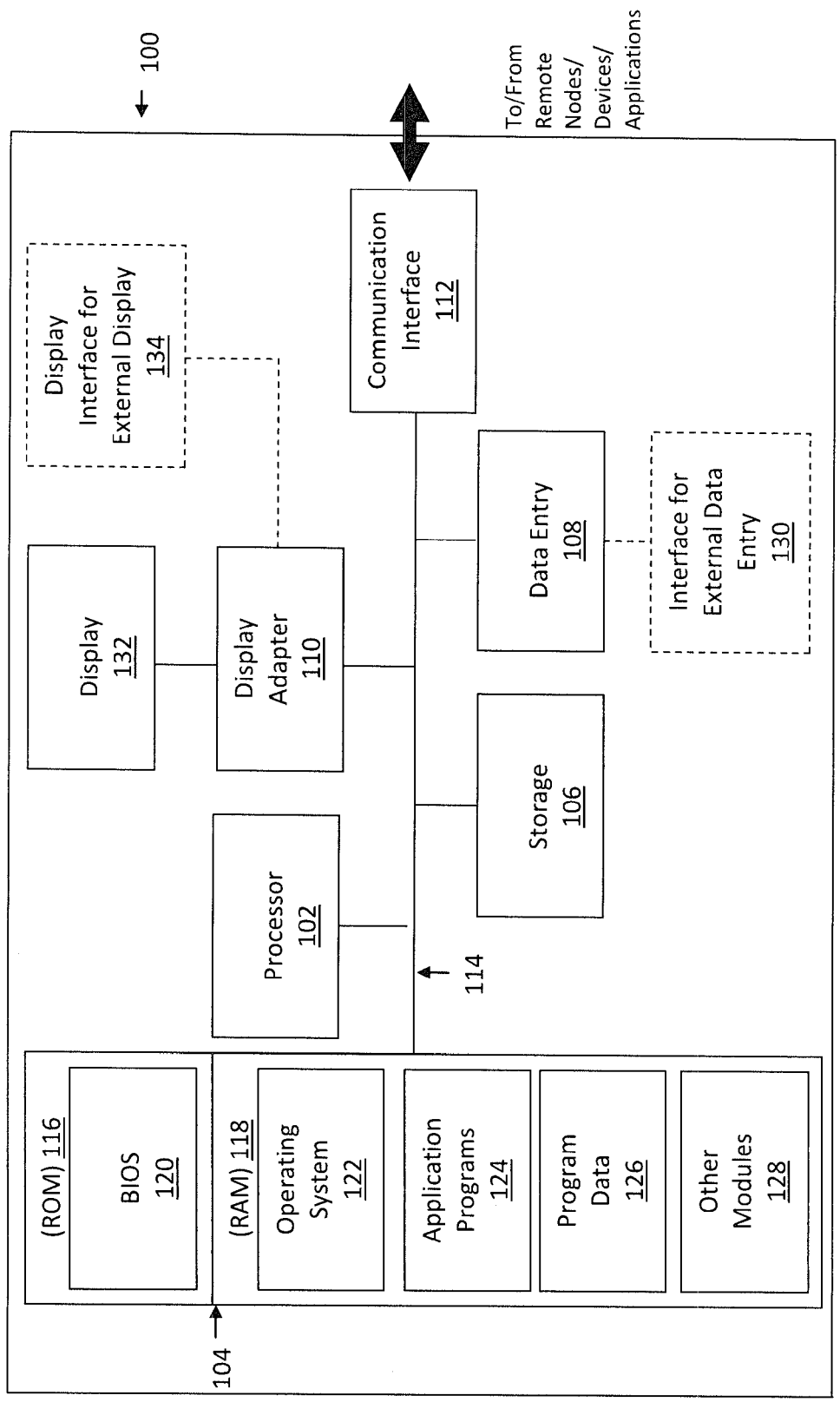
FIG. 1 is a block diagram illustrating an example hardware device in which the subject matter may be implemented.

In the prior art, backup applications may access backup files on storage devices using the standard network file system protocol. While many backup applications execute in the background of a source device as a root user, a network storage device granting access to backup files for any application identified as a root user is undesirable from a security perspective. Therefore, when a backup application requests access to backup files on a secure network storage device, an operating system that is executing the backup application enables the backup application to impersonate a user that has secure access to the requested backup files.

However, such network user access impersonation creates issues for multi-threaded backup applications because operating systems such as UNIX® force every thread of the backup application to impersonate the same user. For example, a first thread of a backup application is about to access a first backup file on a first secure network storage as a first user that has secure access to the first backup file, and a second thread of the backup application requests its host operating system to enable access to a second backup file on a second secure network storage device. In this situation, if the host operating system enables the second thread to impersonate a second user that has secure access to the second backup file, host operating systems such as UNIX® force the first thread of the same backup application to impersonate the identity of the second user, who may not have secure access to the first backup file. Network user access impersonation for multi-threaded backup applications may result in other errors, such as improper access, privilege escalation, and privilege diminishment. Due to this multi-threading issue, backup applications may be required to protect and serialize the use of all system calls which are affected by the process identity, a cumbersome task requiring developer effort to identify and convert all such existing uses in the program code as well as future resources to consistently maintain and insure compliance with this practice. Furthermore, a backup application component may not execute as a root user if the application component is invoked by an end user or an application service, thereby failing to meet some operating systems' requirement for the backup component to execute as a root user before enabling the component to impersonate a specific user who has the secure access to a specific backup file.

Embodiments herein enable the correct network user access impersonation for multi-threaded backup applications. A backup application receives a first user identity and a second user identity of a set of user identities that correspond to secure backup files. The backup application calls a network file system service, which applies the first user identity to a first thread of a backup application, and later applies the second user identity to a second thread of the backup application. The backup application can directly apply the network file system protocol to enable specific threads to impersonate specific users, without disruption to unrelated threads and without some operating systems' requirement for a backup application component to execute as a root user, by removing the call to the network file system service from the backup application's host operating system. Therefore, the network file system service enables the first thread to access a first backup file on a first network storage device based on the first user identity, and enables the second thread to access a second backup file on a second storage device based on the second user identity, thereby enabling the correct network user access impersonation for multi-threaded backup applications.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for network user access impersonation for multi-threaded backup applications.

In the prior art, network user access impersonation creates issues for multi-threaded backup applications because some operating systems force every thread of the backup application to impersonate the same user. Furthermore, a backup application component may not execute as a root user, thereby failing to meet some operating system's requirement for the backup component to execute as a root user before enabling the component to impersonate a specific user who has the secure access to a specific backup file. Embodiments of the present disclosure provide a backup application that directly applies the network file system protocol to enable specific threads to impersonate specific users, without disruption to unrelated threads and without some operating systems' requirement for a backup application component to execute as a root user, by removing the call to the network file system service from the backup application's host operating system.

Figure 2:
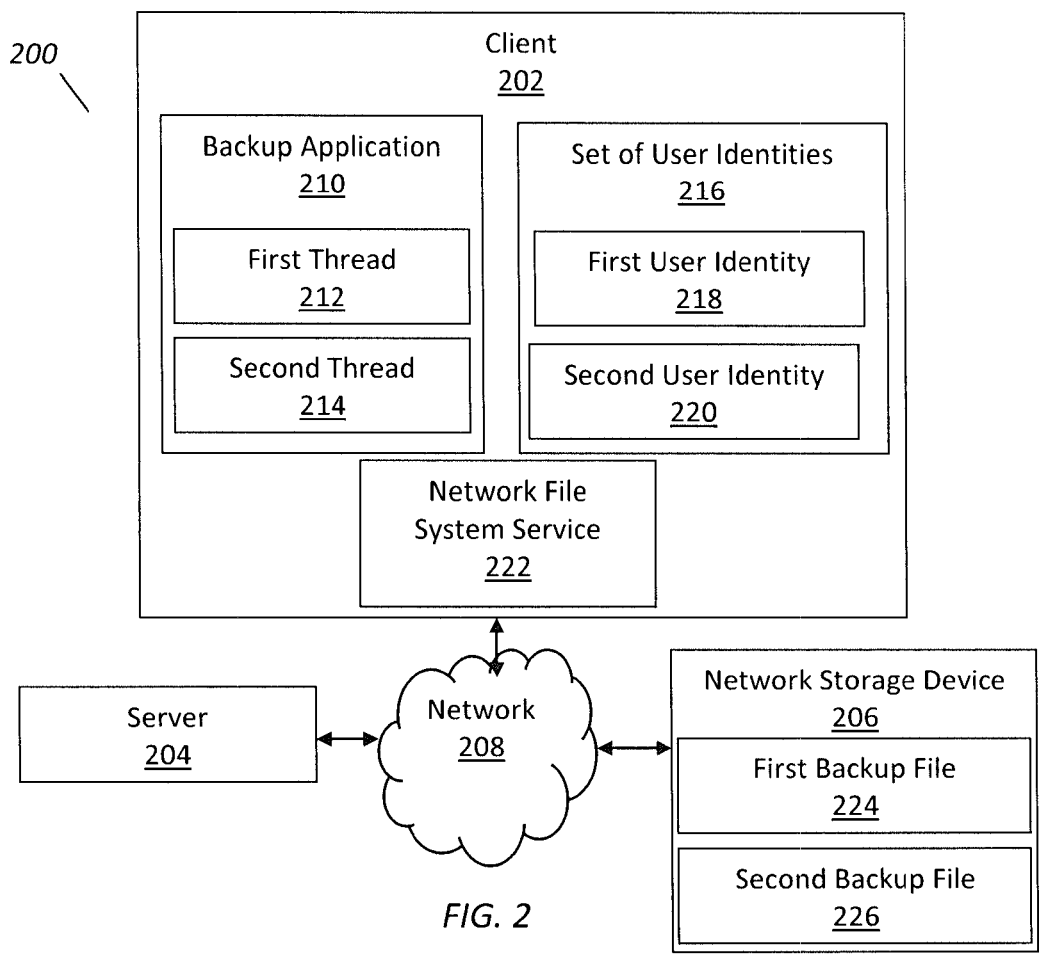
FIG. 2 illustrates a block diagram of an example system for network user access impersonation for multi-threaded backup applications, under an embodiment.

FIG. 2 illustrates a block diagram of a system that implements network user access impersonation for multi-threaded backup applications, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202, and a server 204 that is provided by a hosting company. The client 202 and the server 204 communicate with a network storage device 206 via a network 208. The client 202 includes a backup application 210, which includes a first thread 212 and a second thread 214, a set of user identities 216, which includes a first user identity 218 and a second user identify 220, and a network file system service 222. The storage device 212 includes a first backup file 224 and a second backup file 226. Although FIG. 2 depicts the system 200 with one client 202, one server 204, one network storage device 206, one network 208, one backup application 210, two threads 212-214, one set of user identities 216, two user identities 218-220, one network file system service 222, and two backup files 224-226, the system 200 may include any number of clients 202, servers 204, network storages devices 206, networks 208, backup applications 210, threads 212-214, sets of user identities 216, user identities 218-220, network file system services 222, and backup files 224-226. The client 202 and the server 204 may each be substantially similar to the system 100 depicted in FIG. 1.

The functioning of the system 200 may be illustrated by the following example in which an end user instructs the backup application 210 to execute a restore operation to restore the most current backup data to the client 202, in which some of the backup data is needed from the prior week's full backup of data and some of the backup data is needed from more recent incremental backup data. A separate thread is used to restore data from each data component simultaneously. The purpose of using multiple threads is to perform tasks concurrently, as it is common or desirable to perform concurrent backup or restore tasks. Such a combination of actions would create problems in the prior art if the two different backup files are only accessible by two different user identities and the host operating system for the backup application 210 forces every thread of the backup application 210 to impersonate the same user identity. Each user identity may provide access to a different storage device.

A backup application receives a first user identity and a second user identity of a set of user identities. For example, the backup application 210 receives the first user identity 218, which is the backup application's service identity that enables access to the first backup file 224, the prior week's state of the backup data, and the second user identity 220, which is the backup application's service identity that enables access to the second backup file 226, the incremental backup data. The set of user identities 216 may include a user identity for each backup file stored by each network storage device accessible by the backup application 210.

A backup application calls a network file system service. For example, the backup application 210 calls the network file system service 222 based on a first request from the first thread 212 to restore data from the first backup file 224, the prior week's full backup of the data, and then later a second request from the second thread 214 to restore data from the second backup file 226, the incremental backup data, to the client 202. Calling the network file system service 222 may be accomplished by executing a remote procedure call to a network file system server via a network file system library. Maintenance of the backup application 210 is simplified by implementing the relevant code in a network file system library, avoiding impact to the program code of the backup application 210 in other areas.

A network file system service applies a first user identity to a first thread of a set of threads of a backup application. For example, the network file system service 222 applies the first user identity 218, which is the backup application's service identity that enables access to the first backup file 224, the prior week's full backup of the data, to the first thread 212, which is requesting to restore the backup of files and directories that were modified in the client 202 before the prior week's backup was copied from the client 202 to the first backup file 224.

A network file system service applies a second user identity to a second thread of a set of threads of a backup application. For example, the network file system service 222 applies the second user identity 220, which is the backup application's service identity that enables access to the second backup file 226, the incremental backup data that was modified in the client 202 after the prior week's full backup was copied, to the second thread 214, which is requesting a restore operation to restore the second backup file 226 to the client 202.

A network file system service enables a first thread to access a first backup file on a first network storage device based on a first user identity. For example, the network file system service 222 enables the first thread 212, which is requesting to restore the prior week's full backup of files and directories that were modified in the client 202 before the prior week's full backup was copied from the client 202 to the first backup file 224, to access the first backup file 224, the prior week's full backup of the data in the client 202, based on the first user identity 218, which is the backup application's first service identity. In this example, the first thread 212 continues to impersonate the first user identity 218, which is the backup application's first service identity, even if the network file system service 222 applies the second user identity 220, to the second thread 214 before the first thread 212 accesses the first backup file 224. The backup application 210 can directly apply the network file system protocol to enable specific threads to impersonate specific users, without disruption to unrelated threads, by removing the call to the network file system service 222 from the operating system for the backup application 210.

A network file system service enables a second thread to access a second backup file on a second network storage device based on a second user identity. For example, the network file system service 222 enables the second thread 214, which is requesting a restore operation to restore the second backup file 226 to the client 202, to access the second backup file 226, the incremental backup data which was modified in the client 202 after the prior week's full backup was copied, based on the second user identity 220, which is the backup application's second service identity. The first network storage device may be the same as the second network storage device, or different from the second network storage device. For example, the first backup file 224 and the second backup file 226 may be stored on the same network storage device 206 or stored on multiple network storage devices (not depicted in FIG. 2).

Enabling access to the first backup file 224 and/or the second backup file 224 may include enabling a source device to directly access files via the network storage device 206. Direct file access enables source devices, such as the client 202, to bypass communication of backup data through an intermediate server, such as the server 204, to and from a storage device, such as the network storage device 206, by enabling the source devices to communicate backup data directly to and from the storage device without communicating the backup data through the intermediate server.

Embedded support of the network file system protocol establishes the system 200 as platform independent, allowing the use of network file system-based storage even when the host operating system for the backup application 210 does not provide network file system client services. The backup application 210 can directly apply the network file system protocol to enable specific threads to impersonate specific users, without disruption to unrelated threads and without some operating systems' requirement for a backup application component to execute as a root user, by removing a call to the network file system service 222 from the operating system for the backup application 210.

Figure 3:
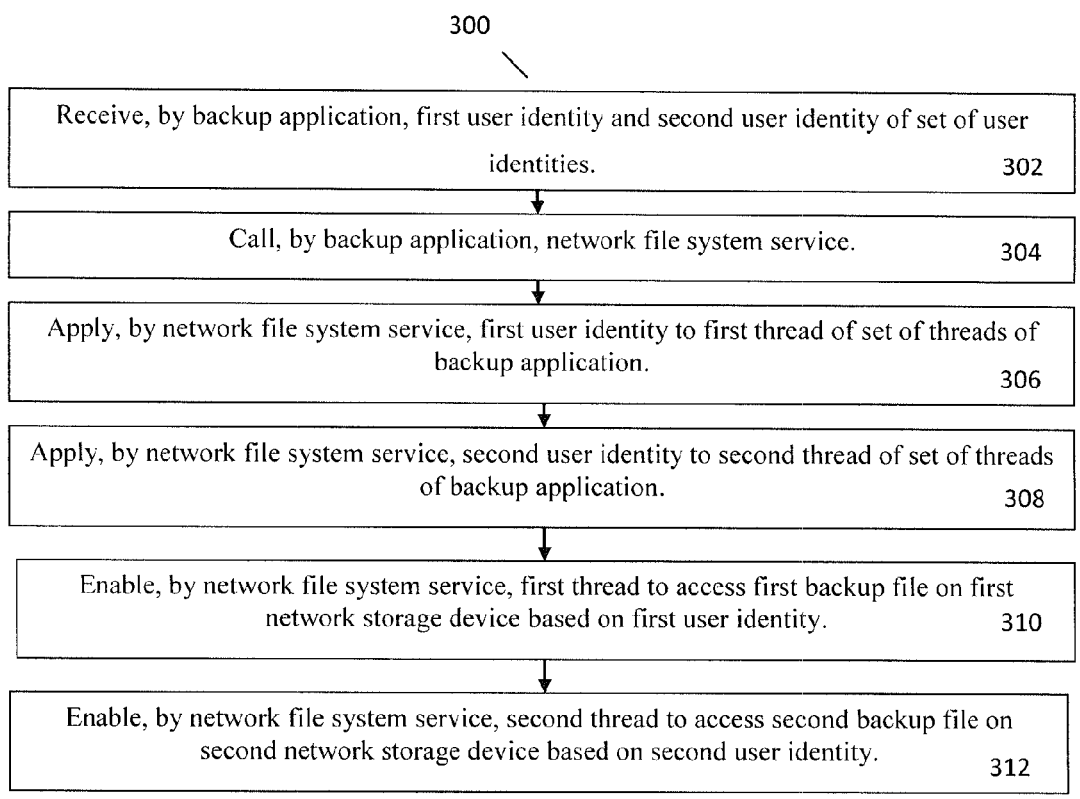
FIG. 3 is a flowchart that illustrates a method of network user access impersonation for multi-threaded backup applications, under an embodiment.

FIG. 3 is a flowchart that illustrates a method of network user access impersonation for multi-threaded backup applications. Flowchart 300 illustrates method acts illustrated as flowchart blocks for certain steps involved in and/or between the client 202 and/or the server 204 of FIG. 2.

A backup application receives a first user identity and a second user identity of a set of user identities, act 302. For example, the backup application 210 receives the first user identity 218, which is the backup application's service identity that enables access to the first backup file 224, and the second user identity 220, which is the backup application's service identity that enables access to the second backup file 226.

A backup application calls a network file system service, act 304. For example, the backup application 210 calls the network file system service 222 based on a first request from the first thread 212 to restore data from the prior week's full backup of files and directories from the first backup file 224, and then later a second request from the second thread 214 to restore data from the subsequent incremental backup of files and directories from the second backup file 226 to the client 202.

A network file system service applies a first user identity to a first thread of a set of threads of a backup application, act 306. For example, the network file system service 222 applies the first user identity 218 to the first thread 212, which is requesting to restore data from the prior week's full backup of files and directories from the first backup file 224, the prior week's state of data in the client 202.

A network file system service applies a second user identity to a second thread of a set of threads of a backup application, act 308. For example, the network file system service 222 applies the second user identity 220 to the second thread 214, which is requesting a restore operation to restore the second backup file 226, the incremental changes to data in the client 202 since a specific point in time last week, to the client 202.

A network file system service enables a first thread to access a first backup file on a first network storage device based on a first user identity, act 310. For example, the network file system service 222 enables the first thread 212 to access the first backup file 224, the prior week's full backup of data in the client 202, based on the first user identity 218, which is the backup application's first service identity.

A network file system service enables a second thread to access a second backup file on a second network storage device based on a second user identity, act 312. For example, the network file system service 222 enables the second thread 214 to access the second backup file 226 based on the second user identity 220, which is the backup application's second service identity.

Although FIG. 3 depicts the acts 302-312 occurring in a specific order, the acts 302-312 may occur in another order. Embodiments herein provide a backup application that directly applies the network file system protocol to enable specific threads to impersonate specific users, without disruption to unrelated threads and without some operating systems' requirement for a backup application component to execute as a root user, by removing the call to the network file system service from the backup application's host operating system, The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for network user access impersonation for multi-threaded backup applications, the system comprising:
   a processor-based application, which when executed on a computer, will cause the processor to:
      receive, by a backup application using a set of threads to concurrently perform a plurality of tasks associated with a restore operation on a client, a first user identity and a second user identity of a set of user identities, the first user identity and the second user identity corresponding to the restore operation;
      call, by the backup application, a network file system service;
      apply, by the network file system service, the first user identity to a first thread of the set of threads of the backup application executing a first set of tasks of the plurality of tasks;
      apply, by the network file system service, the second user identity to a second thread of the set of threads of the backup application executing a second set of tasks of the plurality of tasks;
      enable, by the network file system service, the first thread to access, for the restore operation on the client, a first backup file on a first network storage device based on the first user identity; and
      enable, by the network file system service, the second thread to access, for the restore operation on the client, a second backup file on a second storage device based on the second user identity.

2. The system of claim 1, wherein at least one component of the backup application executes with a user identity other than a root user identity.

3. The system of claim 1, wherein the backup application is executed by an operating system that lacks provision of network file system services for the backup application.

4. The system of claim 1, wherein calling the network file system service comprises executing a remote procedure call to a network file system server via a network file system library.

5. The system of claim 1, wherein enabling access to at least one of the first backup file and the second backup file comprises at least one of enabling storing of backup data from a source device to the network storage device and enabling restoring of backup data from the network storage device to the source device.

6. The system of claim 1, wherein enabling access to at least one of the first backup file and the second backup file comprises enabling a source device to directly access files via the network storage device.

7. The system of claim 1, wherein the first network storage device comprises the second network storage device.

8. A computer-implemented method for network user access impersonation for multi-threaded back applications, the method comprising:
   receiving, by a backup application using a set of threads to concurrently perform a plurality of tasks associated with a restore operation on a client, a first user identity and a second user identity of a set of user identities, the first user identity and the second user identity corresponding to the restore operation;
   calling, by the backup application, a network file system service;
   applying, by the network file system service, the first user identity to a first thread of the set of threads of the backup application executing a first set of tasks of the plurality of tasks;
   applying, by the network file system service, the second user identity to a second thread of the set of threads of the backup application executing a second set of tasks of the plurality of tasks;
   enabling, by the network file system service, the first thread to access, for the restore operation on the client, a first backup file on a first network storage device based on the first user identity; and
   enabling, by the network file system service, the second thread to access, for the restore operation on the client, a second backup file on a second storage device based on the second user identity.

9. The computer-implemented method of claim 8, wherein at least one component of the backup application executes with a user identity other than a root user identity.

10. The computer-implemented method of claim 8, wherein the backup application is executed by an operating system that lacks provision of network file system services for the backup application.

11. The computer-implemented method of claim 8, wherein calling the network file system service comprises executing a remote procedure call to a network file system server via a network file system library.

12. The computer-implemented method of claim 8, wherein enabling access to at least one of the first backup file and the second backup file comprises at least one of enabling storing of backup data from a source device to the network storage device and enabling restoring of backup data from the network storage device to the source device.

13. The computer-implemented method of claim 8, wherein enabling access to at least one of the first backup file and the second backup file comprises enabling a source device to directly access files via the network storage device.

14. The computer-implemented method of claim 8, wherein the first network storage device comprises the second network storage device.

15. A computer program product, comprising a non-transitory computer-readable medium having a computer-readable program code embodied therein, the computer-readable program code adapted to be executed by one or more processors to implement a method for network user access impersonation for multi-threaded backup applications, the method comprising:
receiving, by a backup application using a set of threads to concurrently perform a set plurality of tasks associated with a restore operation on a client, a first user identity and a second user identity of a set of user identities, the first user identity and the second user identity corresponding to the restore operation;
calling, by the backup application, a network file system service;
applying, by the network file system service, the first user identity to a first thread of the set of threads of the backup application executing a first set of tasks of the plurality of tasks;
applying, by the network file system service, the second user identity to a second thread of the set of threads of the backup application executing a second set of tasks of the plurality of tasks;
enabling, by the network file system service, the first thread to access, for the restore operation on the client, a first backup file on a first network storage device based on the first user identity; and
enabling, by the network file system service, the second thread to access, for the restore operation on the client, a second backup file on a second storage device based on the second user identity.

16. The computer program product of claim 15, wherein at least one component of the backup application executes with a user identity other than a root user identity.

17. The computer program product of claim 15, wherein the backup application is executed by an operating system that lacks provision of network file system services for the backup application.

18. The computer program product of claim 15, wherein calling the network file system service comprises executing a remote procedure call to a network file system server via a network file system library.

19. The computer program product of claim 15, wherein enabling access to at least one of the first backup file and the second backup file comprises at least one of enabling storing of backup data from a source device to the network storage device and enabling restoring of backup data from the network storage device to the source device.

20. The computer program product of claim 15, wherein enabling access to at least one of the first backup file and the second backup file comprises enabling a source device to directly access files via the network storage device.

* * * * *